H. A. HERPST.
DIRIGIBLE HEADLIGHT FOR AUTOMOBILES.
APPLICATION FILED MAY 11, 1922.
1,436,959. Patented Nov. 28, 1922.
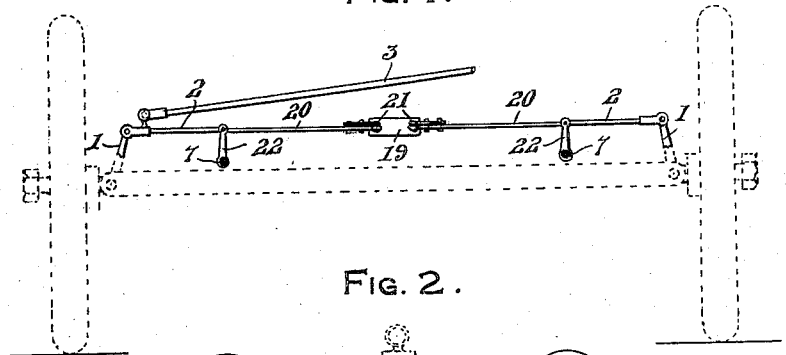
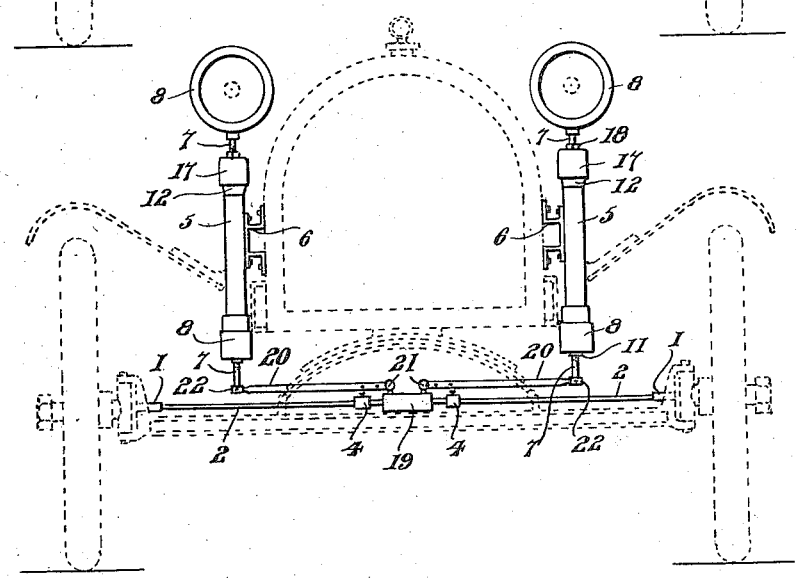
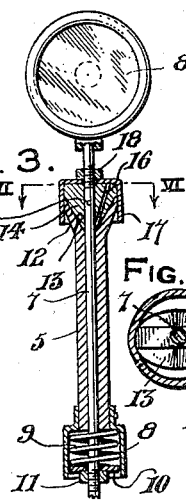
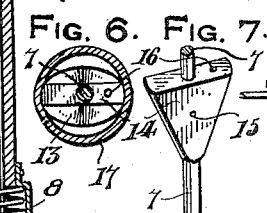
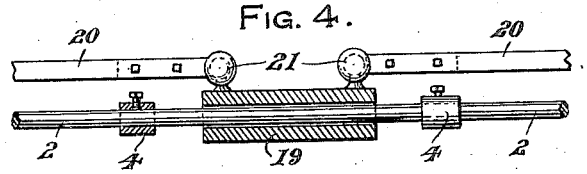
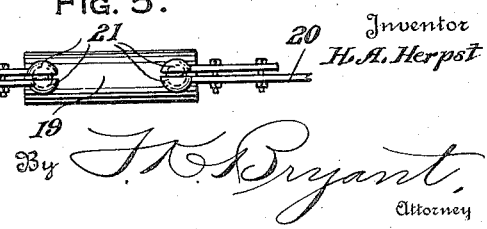

Patented Nov. 28, 1922.

1,436,959

UNITED STATES PATENT OFFICE.

HERMAN A. HERPST, OF NORWAY, MICHIGAN.

DIRIGIBLE HEADLIGHT FOR AUTOMOBILES.

Application filed May 11, 1922. Serial No. 560,038.

*To all whom it may concern:*

Be it known that I, HERMAN A. HERPST, a citizen of the United States of America, residing at Norway, in the county of Dickinson and State of Michigan, have invented certain new and useful Improvements in Dirigible Headlights for Automobiles, of which the following is a specification.

This invention relates to certain new and useful improvements in dirigible headlights for automobiles and has particular reference to the idea of connecting the headlight mounting to the steering mechanism of the automobile to cause the rays projected from the headlight to travel in a path directly forwardly of the steering wheel.

The invention further embodies in a dirigible headlight mechanism of the type above described, operative connections between the steering mechanism of the automobile and the headlights, whereby the steering wheels of the automobile may slightly turn in either direction without effecting the position of the headlight, as in traveling upon a straight road and deviating from a straight line.

A further object of the invention has reference to a dirigible headlight having a degree of loose play between the steering mechanism of the automobile and the headlight supports with spring devices associated with each headlight support to compensate for the loose play and also for properly centering the headlight in the direct forward travel of the automobile.

With the above general objects in view and others that will appear as the nature of the invention is better understood, the same consists in the novel construction, combination and arrangement of parts hereinafter more fully described, illustrated in the accompanying drawing, and pointed out in the appended claims.

In the drawings forming a part of this application and in which like designating characters refer to corresponding parts throughout the several views:—

Figure 1 is a fragmentary top plan view of the steering mechanism of an automobile showing the front axle and steering wheel and the dirigible headlight mechanism associated with the steering mechanism and lamp support;

Figure 2 is a front elevational view of the headlight support and steering mechanism, and further showing by dotted lines the front end of an automobile;

Figure 3 is a vertical sectional view of one of the headlight supports showing the tensioned vertically shiftable and rotatable lamp supporting rods;

Figure 4 is a fragmentary detail sectional view, showing a portion of the dirigible mechanism illustrated as connected to the steering rod of the automobile;

Figure 5 is a fragmentary top plan view of a portion of the dirigible mechanism shown in Figure 4;

Figure 6 is a detail sectional view taken on line VI—VI of Figure 3 showing the oval shaped socket and the V-shaped blocks associated with the lamp supporting posts, Figure 7 is a fragmentary perspective view of the lamp supporting posts and V-shaped blocks connected thereto.

Referring more in detail to the accompanying drawing, the reference numeral 1 designates the knuckles of the steering mechanism which are connected by the steering rod 2, the rod 3 associated with the steering rod 2 being in communication with the steering post of the automobile. As shown in Figures 2 and 4, a pair of spaced collars 4 are adjustably secured to the steering rod 2 which constitutes a part of the dirigible headlight mechanism associated with the steering mechanism.

As shown in Figures 2 and 3, a perpendicular headlight supporting post 5 having an axial bore is secured by a bracket 6 to each side of the automobile radiator, and has rotatably and vertically shiftable therein a rod 7 supporting a headlight lamp 8. The lower end of the rod 7 projects below the lower end of the post 5 and is enclosed by a sleeve 8 secured to the lower end of the post. A coil spring 9 positioned in the sleeve 8 surrounds the rod 7, engaging the lower end of the post at its upper end and engaging the disk 10 at its lower end that is adjustably mounted upon the rod by the lock nut 11 threaded onto the lower end of the rod as shown in Figure 3. The upper end of the post 5 is provided with an enlarged head 12 having an oval shaped conical socket 13 formed therein that communicates with the axial bore of the post, a V-shaped block 14 secured as at 15 to the rod 7 being received in the socket 13 and normally occupying the positions shown in Figures 3 and 6 when the headlight lamp 8 is in its direct forward position. For purposes of lubricating the lamp rod 7 an oil passage 16 is provided in the block 14 for communication with bore of the post as shown in Figure 3. The perimeter of the head 12 is circular in plan view, and the block 14 and head 12 are enclosed by a cap 17 that is rotatable upon the perimeter of the head 12 and is fixed to the block 14 by the set nut 18.

The connection between the lamp supporting rods 7 and the steering rod 2 embodies a sleeve 19 slidable upon the steering rod between the adjustable blocks 4 as shown in Figs. 2 and 4, link arms 20 being pivotally connected at their outer ends to the lower projecting ends of the rods 7 and carrying at their adjacent ends sectional socket members 21 enclosing ball studs carried by opposite ends of the sleeves 19, the blocks 4 being set to the position shown in Figures 2 and 4 to permit a slight sliding movement of the sleeve 19 upon the steering rod 2, independently of the movement of said steering rod, and likewise permitting a movement of the steering rods without effecting movement of the sleeve 19.

In the operation of the device, when the automobile is traveling in a direct forward path, the major axis of the V-shaped block 14 conicides with the major axis of the oval shaped opening or conical socket 13 in the post head 12, it being so maintained by the spring 9 associated with the lower end of the rod in traveling directly forwardly, and also slightly deviating from a direct path of travel, the steering rod 2 is permitted to move relatively of the sleeve 19 without effecting movement of the sleeve to shift the headlights 8. In turning, as in rounding a corner, the steering rod 2 is shifted a sufficient distance to cause either of the blocks 4 to engage the adjacent end of the sleeve 19 to shift the sleeve and the link arm 20 connected thereto, the bracket arms 22 connecting the outer ends of the links 20 to the lower end of the lamp rods 7 as shown in Figure 1 operating the rods 7 to cause the rays projected from the headlights 8 to travel directly forwardly of the steering wheel. When the lamp rod 7 is rotated, the V-shaped block 14 carried thereby is elevated in the tapering socket 13 formed in the post head 12 by positioning the major axis of the block 14 transversely of the major axis of the oval shaped socket 13, the cap 17 being elevated with the lamp rod 7 and also rotating upon the perimeter of the post head 12. The reverse operation of the rods 7 is effected when the steering wheels are returned to their initial position, the spring 9 lowering the rod 7 to cause the block 14 to occupy the position shown in Figures 3 and 6. With the type of block 14 and socket 13 above described, the blocks 4 upon the steering rod 2 may be set in a position to permit slight shifting movement of the steering wheels without effecting operation of the dirigible headlight, the spring 9 associated with each post 5 cooperating with the block 14 and socket 13 for maintaining the headlight lamps 8 in their direct forward position. The pivotal connections between the sleeve 19 and the link rods 20, and the lower ends of the lamp rods 7 permits free perpendicular movements of said lamp rods relative to the sleeve, the bracket arm 22 associated with the lower ends of the rods 7 permitting rotation thereof.

While the form of the invention herein shown and described is what is believed to be the preferred embodiment thereof, it is nevertheless to be understood that various forms, modifications and arrangements of the parts may be made without departing from the spirit and scope of the invention as claimed.

Having thus fully described the invention, what I claim as new is:—

1. In dirigible headlight mechanisms, the combination with the steering rod of an automobile, of a pair of headlights, a post supporting each light, a rod journaled in the post with the headlight secured to the upper end thereof, connecting means between the headlight supporting rod and the steering rod, a conical oval shaped socketed head carried by each post, a V-shaped block having opposite parallel faces fixed to each lamp supporting rod disposed in said sockets, a cap enclosing the socketed head and block, and resilient means associated with the lamp supporting rod and disposed below the post for maintaining the major axes of the V-shaped block and oval shaped socket in alinement.

2. In a dirigible headlight for automobiles, a lamp supporting post having an axial bore therein, a rod journaled in said bore, a lamp supported at the upper end of the rod, a head carried by the upper end of the post having a conical oval shaped socket therein, a V-shaped block having opposite parallel faces secured to the lamp supporting rod disposed in said socket with the major axes of the block and socket alined, and resilient means disposed between the lower end of the post and the lower end of the rod for maintaining said axes in alinement.

3. In a dirigible headlight for automobiles, a lamp supporting post having an axial bore therein, a rod journaled in said bore, a lamp supported at the upper end of the rod, a head carried by the upper end of the post having a conical oval-shaped socket therein, a V-shaped block having opposite parallel faces secured to the lamp supporting rod disposed in said socket with the major axes of the block and socket alined, and resilient means disposed between the lower end of the post and the lower end of the rod for maintaining said axes in alinement, and said V-shaped blocks having a lubricant passage therein communicating with the bore of the lamp supporting post.

In testimony whereof I affix my signature.

HERMAN A. HERPST.